United States Patent [19]

Wagensonner

[11] 4,066,347

[45] Jan. 3, 1978

[54] MOTION PICTURE CAMERA WITH VARIABLE APERTURE CONTROL RATE

[75] Inventor: Eduard Wagensonner, Aschheim, Germany

[73] Assignee: AGFA-Gevaert, AG, Leverkusen, Germany

[21] Appl. No.: 639,375

[22] Filed: Dec. 10, 1975

[30] Foreign Application Priority Data

Dec. 20, 1974 Germany .............................. 2460675

[51] Int. Cl.² .............................................. G03B 7/08
[52] U.S. Cl. .................. 352/141; 354/23 D; 354/44; 354/60 A; 354/271
[58] Field of Search .............. 354/23 D, 43, 44, 60 A, 354/271; 352/141; 318/696

[56] References Cited

U.S. PATENT DOCUMENTS

| 3,328,658 | 6/1967 | Thompson | 318/696 |
| 3,813,680 | 5/1974 | Wagensonner et al. | 352/141 |

FOREIGN PATENT DOCUMENTS 2,507,637  9/1975  Germany .......................... 354/23 D Primary Examiner—Russell E. Adams
Attorney, Agent, or Firm—Michael J. Striker

[57] ABSTRACT

The pulse repetition rate of a pulse generator furnishing pulses to a stepmotor which opens and closes the aperture in response to signals indicating that the quantity of light falling on the film is too little or too much respectively, is varied so that the aperture size is changed more rapidly when the difference between the desired and the actual quantity of light falling on the film is great, and is changed more slowly as the quantity of light falling on the film approaches the desired light quantity.

8 Claims, 3 Drawing Figures

EDUARD WAGENSONNER

MOTION PICTURE CAMERA WITH VARIABLE APERTURE CONTROL RATE

BACKGROUND OF THE INVENTION:

The present invention relates to motion picture cameras. More particularly, it relates to motion picture cameras which have photosensitive receiver means which furnish a signal to aperture control means, the photosensitive receiver means being positioned behind the aperture in the path of light falling on the film so that the quantity of light falling on the photoreceiver means is indicative of the quantity of light falling on the film at the particular aperture size. Even more specifically, the present invention relates to motion picture cameras wherein the size of the aperture is controlled by means of a stepmotor which, in turn, has windings energized by a pulse generator. Of course the pulse generator furnishes a pulse sequence to the stepmotor only when the quantity of light falling on the film differs from the desired quantity. Further, the repetition rate of the pulse generator of course determines the rate at which the stepmotor operates and therefore the rate at which the aperture is opened or closed.

A source of error in conventional cameras of this type is the inertia or time-delay behavior inherent in the photoreceiver. This of course should be compensated for in order that the aperture size is correct for the prevailing light conditions.

SUMMARY OF THE INVENTION

It is an object of the present invention to compensate for the inertia or time delay inherent in the photoreceiver and, further, to effect the opening or closing of the aperture at the highest possible speed without causing overshoots after the desired aperture size has been attained.

In accordance with the present invention, a motion picture camera has film, a diaphragm having an aperture, and aperture control means for controlling the size of said aperture until the quantity of light falling on said film is a desired light quantity. The aperture control means include a stepmotor energized by a pulse generator. The pulse generator furnishes pulses to the stepmotor at a pulse repetition rate or frequency determined by a timing circuit having timing circuit elements. The present invention comprises the improvement of varying said pulse repetition rate as a function of the difference between the actual quantity of light falling on said film and said desired quantity and in such a manner that said pulse repetition rate varies inversely as said difference. In accordance with this invention, therefore, the average speed of opening and closing the diaphragm is relatively high but overshoots are prevented in that the speed is slowed down as the desired setting is approached. Further, although the inertia of the photosensitive element may introduce some error at the high repetition rate or at the high adjustment speed, the lower repetition rate is such that the inertia effect of the photosensitive receiver does not affect the desired setting at all. Thus all objects of the present invention are met.

In a preferred embodiment of the present invention the aperture control means include a photosensitive receiver which receives light indicative of the quantity of light falling on the film and furnishes a corresponding electrical light signal. Balanceable circuit means are connected to the photosensitive receiver means. These are balanced when the quantity of light falling on the photosensitive receiver means corresponds to the desired quantity of light falling on the film. The balanceable circuit means furnish an aperture control signal whose amplitude varies in a first or a second direction about a reference amplitude when the quantity of light falling on the photosensitive receiver means is indicative of a quantity respectively less than or greater than the desired light quantity. In this embodiment, the frequency varying means for varying the pulse repetition rate of the pulse generator means include a first and second threshold circuit connected to the balanceable circuit means and responsive to the aperture control signal. The first and second threshold means respectively furnish a first and second threshold output signal when the amplitude of the aperture control signal varies from the reference amplitude by at least a predetermined difference in said first and second direction respectively. Gating circuit means are connected to said first and second threshold circuit means for furnishing a gating output signal in response to said first or said second threshold output signal. The gating output signal in turn is applied to switching circuit means which are connected to said timing circuit means for changing said pulse repetition rate in response to said gating output signal. Specifically, during the furnishing of said gating output signal the pulse repetition rate is increased. As the size of the aperture is controlled by said stepmotor means the difference between the desired and the actual quantity of light falling on said photoreceiver means decreases thereby finally causing said gating output signal to extinguish. At this time the pulse repetition rate is lowered. Specifically, in a preferred embodiment of the present invention the switching circuit means comprises a transistor whose emitter-collector circuit short-circuits a resistor forming part of the timing circuit means of the pulse generator in response to the gating output signal. In a preferred embodiment of the present invention the gating means comprise a NAND-gate and an inverter connected between said second threshold means and said NAND-gate. The output of said NAND-gate is connected to said switching circuit means. In an alternate preferred embodiment of the present invention the photosensitive receiver means forms part of a bridge circuit whose output is connected to a differential amplifier. The differential amplifier furnishes an output signal (aperture control signal) whose polarity is a first or second polarity depending upon whether the quantity of light falling on the photosensitive element is less than or greater than the desired light quantity. Light-emitting means are connected to the output of said differential amplifier. The light-emitting means are positioned to illuminate a light-sensitive receiver which forms part of the timing circuit of the pulse generator means. In a preferred embodiment of the invention, the light-emitting means comprise a first and second diode connected with opposite polarity to the output of the differential amplifier. In this preferred embodiment, a continuous frequency change rather than a step-by-step change as in the other embodiment is obtained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
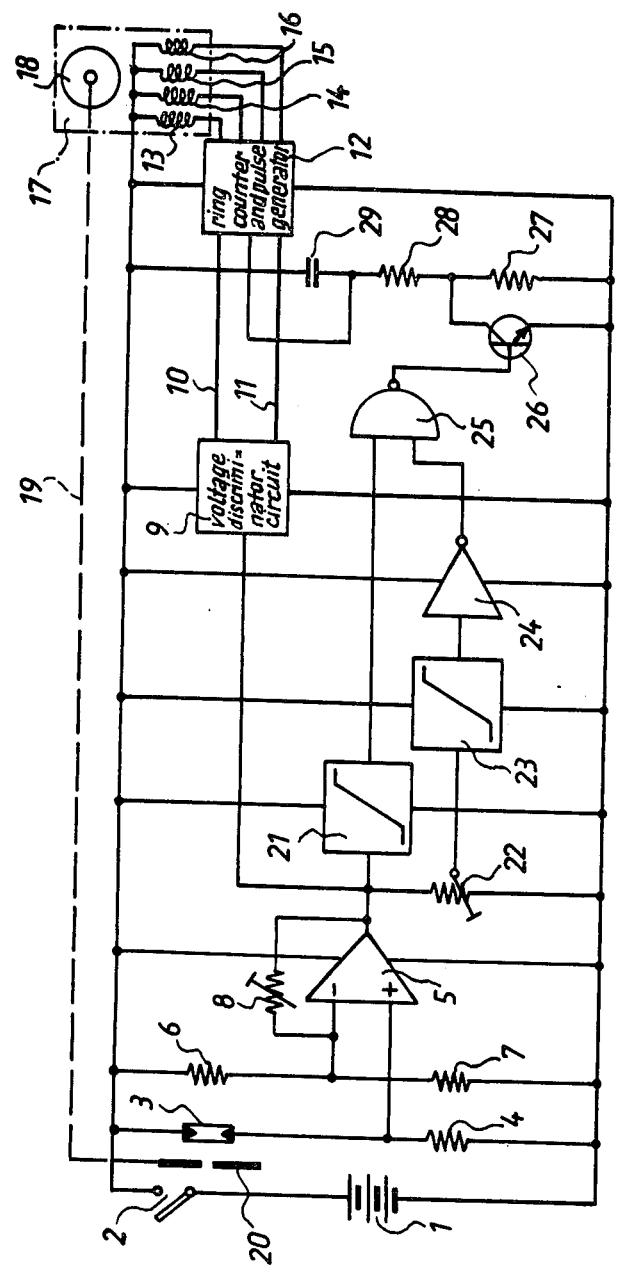
FIG. 1 shows a first embodiment of the present invention.

DESCRIPTION OF THE PREFERRED EMBODIMENTS:

A preferred embodiment of the present invention will now be described with reference to the drawing.

Reference numeral 1 in FIG. 1 denotes a source of voltage, namely a battery, while reference numeral 2 denotes the operating switch. Aperture control means include a photosensitive receiver 3 which, in a preferred embodiment, is a photoresistor. Connected in series with photoresistor 3 is a resistor 4. The common point of photoresistor 3 and resistor 4 is connected to the direct input of a differential amplifier 5. A further voltage divider, comprising a resistor 6 and a resistor 7, connected in parallel with resistors 3 and 4, has a tap connected to the inverting input of the differential amplifier 5. A feedback resistor for the differential amplifier 5 is denoted by reference numeral 8. The output of differential amplifier 5 is connected to a voltage discriminating circuit 9 which has two outputs. The first of these, denoted by 10, furnishes a signal which indicates whether or not the size of the aperture is to be changed, while the second, denoted by reference numeral 11, furnishes a signal indicative of the direction of change. This is not a part of the present invention and is included for completeness only. Digital signals appearing on outputs 10 and 11 are applied to a control circuit 12. Control circuit 12 includes a ring counter as well as a pulse generator. The pulse generator furnishes a sequence of pulses to the pulse counter which energizes the windings 13, 14, 15 and 16 of a stepmotor 17. The armature 18 of stepmotor 17 is connected through appropriate mechanical coupling indicated by a dashed line 19 to the aperture 20. Stepmotor 17, its associated windings 13-16, control circuit 12, voltage discriminator 9, and the bridge circuit and differential amplifier arrangement together, herein referred to as balanceable circuit means, all constitute parts of a known motion picture camera.

The output of operational amplifier 5 is also connected to a first threshold stage 21 herein referred to as first threshold circuit means. It is further connected through a potentiometer 22 to the input of a second threshold circuit 23, herein referred to as second threshold circuit means. The output of threshold circuit 23 is connected through an inverter 24 to one input of a NAND-gate 25 whose other input is connected to the output of threshold circuit 21. The output of NAND-gate 25 is connected to the base of a transistor 26 whose emitter-collector circuit is connected in parallel with a resistor 27. Resistor 27 is connected in series with a resistor 28 and a capacitor 29. Resistors 27 and 28 and capacitor 29 constitute timing circuit means for the pulse generator included in control circuit 12. It should also be noted that in a preferred embodiment of the present invention the gain of differential amplifier 5 is adjusted in such a manner that the signal at its output, herein referred to as the aperture control signal, has a reference amplitude when the quantity of light falling on the film is a desired quantity, namely when the bridge circuit including components 3, 4, 6 and 7 is balanced, and varies from this amplitude in a decreasing or increasing direction in response to signals from said photosensitive receiver means indicative of variations in the quantity of light falling on said photoreceiver means from said desired quantity. The first threshold circuit means thus furnish the first threshold output signal when the amplitude of the aperture control signal has decreased below a predetermined minimum amplitude, while the second threshold circuit means furnish the second threshold output signal when the amplitude of the aperture control signal has increased over a predetermined maximum amplitude. In a preferred embodiment of the present invention the difference in amplitude between said reference amplitude and said predetermined minimum amplitude is the same as the difference in amplitude between said reference amplitude and said predetermined maximum amplitude.

The above-described arrangement operates as follows:

First, let it be assumed that the bridge is unbalanced and that the quantity of light falling on photoresistor 3 is indicative of a very strong intensity of illumination, that is of a quantity of light exceeding the desired light quantity. Under these circumstances the amplitude of the aperture control signal will exceed the desired amplitude and threshold circuit 23 will furnish the second threshold output signal. It should be noted here that for convenience, namely in order to allow threshold circuits 21 and 23 to be identical circuits, the first threshold output signal is a logic "0" signal while the second threshold output signal is a logic "1" signal. Thus, for the conditions assumed at the moment, the output of threshold circuit 21 will be a "1" as will the output of threshold circuit 23. Since inverter 24 inverts the output signal of threshold circuit 23, the NAND-gate output signal, namely the signal at the output of NAND-gate 25 will be a "1" signal. This gating output signal causes transistor 26 to be switched to the conductive state thereby short-circuiting resistor 27. The timing circuit of the pulse generator included in control circuit 12 therefore only includes resistor 28 and capacitor 29. A high pulse repetition rate or frequency is thus assured.

Figure 2:
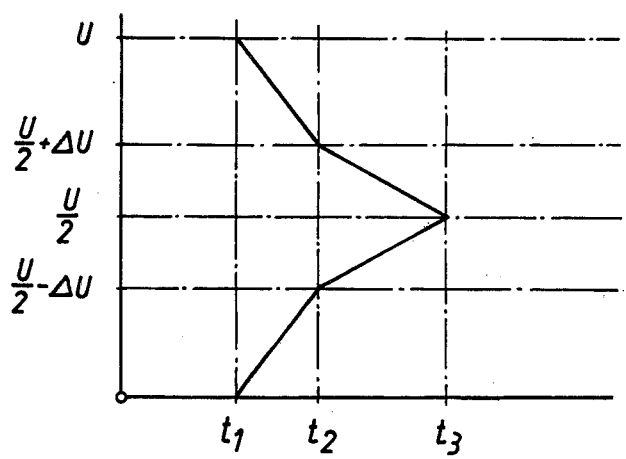
FIG. 2 is a voltage versus time diagram for the embodiment shown in FIG. 1.

Referring now to FIG. 2, the closing of the aperture under control of stepmotor 17 takes place at the high pulse repetition frequency from time $t_1$ to time $t_2$. At time $t_2$ the threshold of threshold circuit 23 is no longer exceeded and its output therefore switches to a "0" signal. This signal is again inverted by inverter 24 causing a "1" signal to appear at the input of NAND-gate 25 whose other input also receives a "1" signal. Under these circumstances the signal at the output of NAND-gate 25 becomes "0" signal causing transistor 26 to block and the pulse repetition rate to become the lower rate as determined by resistors 27 and 28 as well as capacitor 29. It should be noted that the threshold values for threshold stages 21 and 23 as well as the actual values associated with resistors 27 and 28 are dependent upon the inertia or time-delay characteristics of photoresistor 3. To continue, the closing of the aperture continues until time $t_3$ at which time the light falling on photoresistor 3 is indicative of the desired light quantity falling on the film and the regulatory process ceases since the signal on line 10 is absent under these conditions.

Figure 3:
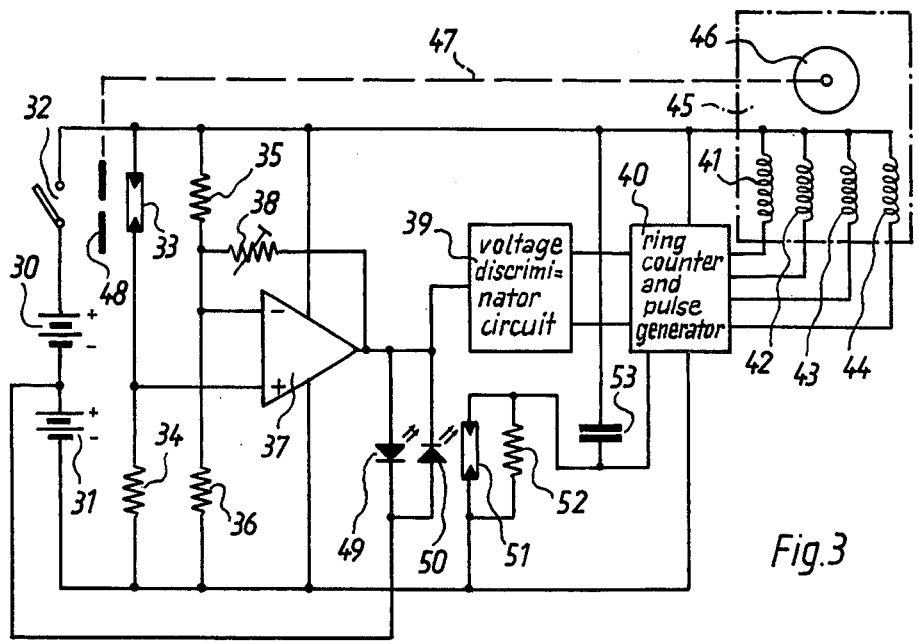
FIG. 3 is a second embodiment of the present invention.

In the embodiment shown in FIG. 3 a first voltage source, namely a battery, is denoted by reference numeral 30 while a second voltage source is denoted by reference numeral 31. The two batteries are connected in series. Through a switch 32 the voltage generated by batteries 30 and 31 is applied to these circuits. The bridge circuit comprises a photoresistor 33, a resistor 34 connected in series with photoresistor 33 and a voltage divider comprising series connected resistors 35 and 36 connected in parallel with photoresistor 33 and resistor 34. The common point of photoresistor 33 and resistor 34 is connected to the direct input of a differential amplifier 37. The inverting input of differential amplifier 37 is connected to the common point of resistors 35 and 36. A feedback resistor is denoted by reference numeral 38. The output of differential amplifier 37 is connected to a voltage discriminator circuit 39 which corresponds to voltage discriminator circuit 9 in FIG. 1. The outputs of voltage discriminator circuit 39 are connected to inputs of a control circuit 40 which corresponds to control circuit 12 of FIG. 1 and also contains the same ring counter and pulse generator as this circuit. Again similarly to FIG. 1, the control circuit outputs energize windings 41, 42, 43 and 44 corresponding to windings 13–16 of FIG. 1. In FIG. 3 the stepmotor is denoted by reference numeral 45 and its armature by reference numeral 46. A mechanical coupling 47 corresponding to that denoted by reference numeral 19 in FIG. 1 couples the armature of the stepmotor to the diaphragm 48 which controls the quantity of light falling on photoresistor 33. However, in FIG. 3 the frequency varying means includes light-emitting means connected to the output of differential amplifier 37. The light-emitting means include a light-emitting diode 49 and a light-emitting diode 50. The diodes are connected in parallel but with opposite polarity. They are positioned to illuminate a photoreceiver 51, also a photoresistor. This is connected in parallel with a resistor 52 and the parallel combination is connected in series with a capacitor 53. Elements 51, 52 and 53 are part of the timing circuit means for the pulse generator contained in unit 40.

When the quantity of light falling on the film differs from a desired quantity in a first or second direction, that is when it exceeds or is less than said desired quantity respectively by a predetermined light quantity difference, one of diodes 49 or 50 emits light causing the parallel combination of elements 51 and 52 to have a very low resistance. The pulse repetition rate is thus very high. As the difference of the actual quantity of light and the desired quantity of light becomes less, the light emitted by the respective diode becomes less causing the equivalent resistance of elements 51 and 52 to increase. Thus a continuous decrease in the pulse repetition frequency takes place. This continuous decrease of course continues until the bridge circuit is again balanced.

It is seen that the present invention results in a rapid and correct adjustment of the diaphragm in accordance with the prevailing light conditions.

While the invention has been illustrated and described as embodied in a specific frequency varying means, it is not intended to be limited to the details shown, since various modifications and circuit changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a motion picture camera having film, a diaphragm having an adjustable aperture for controlling the quantity of light falling on said film, and aperture control means for changing the size of said aperture when the quantity of light falling on said film differs from a desired quantity, said aperture control means including a stepmotor and pulse generator means connected to said stepmotor for furnishing pulses energizing said stepmotor, whereby the rate of change of the size of said aperture with respect to time varies as a function of the repetition rate of the pulses supplied to said stepmotor means by said pulse generator means, the improvement comprising frequency varying means connected to said pulse generator means for varying said repetition rate of said pulses as a function of the difference between said actual quantity of light falling on said film and said desired quantity and in such a manner that said pulse repetition rate decreases in response to decreasing differences between said actual and desired quantities of light falling on said film, wherein said aperture control means comprise photosensitive receiver means positioned to receive light indicative of the quantity of light falling on said film, for furnishing an electrical light signal corresponding thereto, balanceable circuit means connected to said photosensitive receiver means for furnishing an aperture control signal having a reference amplitude when said quantity of light falling on said photosensitive receiver means corresponds to said desired light quantity and varying from said reference amplitude in a first or second direction when said electrical light signal is indicative of a quantity of light falling on said film greater than and less than said desired light quantity respectively; and wherein said frequency varying means comprises means for changing said pulse repetition rate of said pulse generator means from a first to a second pulse repetition rate when the amplitude of said aperture control signal varies from said reference amplitude by a predetermined amplitude difference in said first or said second direction, wherein said frequency varying means comprises first and second threshold circuit means connected to said balanceable circuit means for furnishing, respectively, a first and second threshold output signal when the amplitude of said aperture control signal differs from said reference amplitude by a difference exceeding said predetermined difference in said first and second direction respectively, gating circuit means connected to said first and second threshold circuit means for furnishing a gating output signal in response to said first or said second threshold output signal; wherein said pulse generator means includes timing circuit means including a plurality of timing circuit elements for determining said pulse repetition rate of said pulse generator means; and wherein said frequency varying means further comprises switching circuit means connected between said gating circuit means and said timing circuit means for changing the number of elements in said timing circuit means in response to said gating output signal.

2. A motion picture camera as set forth in claim 1, wherein said switching circuit means comprise a switching transistor having an emiter-collector circuit connected in parallel with a selected one of said timing circuit elements, for short-circuiting said timing circuit element in response to said gating output signal.

3. A motion picture camera as set forth in claim 2, wherein said timing circuit elements include at least one capacitor and a plurality of resistors; and wherein said selected one of said timing circuit elements is a resistor.

4. A motion picture camera as set forth in claim 2, wherein said gating circuit means comprise a NAND-gate having a NAND-gate output connected to said switching circuit means, a first input connected to the output of said first threshold circuit means and a second input, and an inverter connected between said second threshold means and said second input of said NAND-gate.

5. In a motion picture camera having film, a diaphragm having an adjustable aperture for controlling the quantity of light falling on said film, and aperture control means for changing the size of said aperture when the quantity of light falling on said film differs from a desired quantity, said aperture control means including a stepmotor and pulse generator means connected to said stepmotor for furnishing pulses energizing said stepmotor, whereby the rate of change of the size of said aperture with respect to time varies as a function of the repetition rate of the pulses supplied to said stepmotor means by said pulse generator means, the improvement comprising frequency varying means connected to said pulse generator means for varying said repetition rate of said pulses as a function of the difference between said actual quantity of light falling on said film and said desired quantity and in such a manner that said pulse repetition rate decreases in response to decreasing differences between said actual and desired quantities of light falling on said film, wherein said aperture control means comprises photosensitive receiver means positioned to receive light indicative of said quantity of light falling on said film and furnishing an electrical light signal corresponding thereto, balanceable circuit means connected to said photosensitive receiver means for furnishing an aperture control signal having a first polarity when said quantity of light falling on said film is less than a desired light quantity and a second polarity when said quantity of light falling on said film exceeds a desired light quantity; wherein said pulse generator means includes timing circuit means having a plurality of timing circuit elements for determining said pulse repetition rate, said timing circuit elements including a light-sensitive element; and wherein said frequency varying means comprise light-emitting means connected to said balanceable circuit means and positioned to illuminate said light-sensitive receiver means, said light emitted by said light-emitting means varying as a function of the amplitude of said aperture control signal.

6. A motion picture camera as set forth in claim 5, wherein said light-emitting means comprise a first and second light-emitting diode connected to said balanceable circuit means with opposite polarity from each other.

7. In a motion-picture camera provided with an adjustable diaphragm, an automatic diaphragm-setting control system operative for counteracting changes in the quantity of light transmitted by the diaphragm despite changes in the quantity of light incident upon the diaphragm, the sytem comprising, in combination, a step motor coupled to the diaphragm for adjusting the setting of the diaphragm; error-detecting means operative for detecting the error in the transmitted light quantity resulting when the incident light quantity changes from a first constant value to a second constant value; negative-feedback control means operative for effecting a change of the diaphragm setting from a first constant setting to a second constant setting, respectively corresponding to said first and second constant values, including motor-control means operative in response to the error in the transmitted light quantity for applying energizing pulses to the step motor to cause the latter to adjust the diaphragm in a direction reducing the error, the repetition rate of the energizing pulses determining the rate at which the diaphragm setting changes, and frequency-varying means operative while the incident light quantity remains at the second constant value for decreasing the repetition rate in response to the error decrease resulting as the diaphragm setting changes towards the second constant setting.

8. In a motion-picture camera as defined in claim 7, the error-detecting means comprising photosensitive means operative for detecting the transmitted light quantity and means connected to the photosensitive means and forming therewith balanceable circuit means operative for furnishing an error-dependent signal having a reference amplitude when the transmitted light quantity has a predetermined value and varying from the reference amplitude in a first or a second direction when the transmitted light quantity is greater than and less than the predetermined value, respectively, the frequency-varying means comprising means for changing the repetition rate of the energizing pulses from one predetermined rate to a different predetermined rate when the amplitude of the error-dependent signal deviates from the reference amplitude by a predetermined amount in the first or second direction.

* * * * *